United States Patent [19]
Thibault

[11] 3,904,045
[45] Sept. 9, 1975

[54] MACHINE FOR LOADING PACKAGES ON A PALLET

[76] Inventor: Jacques Gabriel Auguste Thibault, 35, rue Robert Legeay, Creteil, Val-de-Marne, France

[22] Filed: Dec. 26, 1973

[21] Appl. No.: 428,065

[30] Foreign Application Priority Data
Dec. 27, 1972 France .................. 72.46505

[52] U.S. Cl. .................. 214/6 BA; 214/6 S
[51] Int. Cl. .................. B65g 57/30
[58] Field of Search .......... 214/6 BA, 6 P, 6 S, 6.5; 271/212

[56] References Cited
UNITED STATES PATENTS

| | | | |
|---|---|---|---|
| 2,857,058 | 10/1958 | Campbell | 214/6 S X |
| 2,979,872 | 4/1961 | Verrinder | 214/6 P |
| 3,187,917 | 6/1965 | Miller | 214/6 F X |
| 3,231,101 | 1/1966 | Cooper | 214/6 BA |
| 3,487,441 | 12/1969 | Sjostrom | 214/6 BA |
| 3,679,072 | 7/1972 | Mueller | 214/6 BA |

Primary Examiner—Robert J. Spar
Assistant Examiner—Leslie J. Paperner
Attorney, Agent, or Firm—Hill, Gross, Simpson, Van Santen, Steadman, Chiara & Simpson

[57] ABSTRACT

The invention relates to a machine for loading packages on a pallet, of the kind in which the successive layers of packages are introduced from the bottom. Said machine comprises, in combination, an area for stacking the packages in layers, constituted by parallel rollers, means for bringing the packages on to the said area, two means for lifting the load of packages during the course of operation through a height sufficient to permit the sliding under the said load of a layer of packages, each of the said lifting means acting in its turn, a horizontal translation means imparting a relative movement of translation between the whole of the said two lifting means and the said stacking area, and lateral retention means for the load of packages during the course of operation.

8 Claims, 8 Drawing Figures

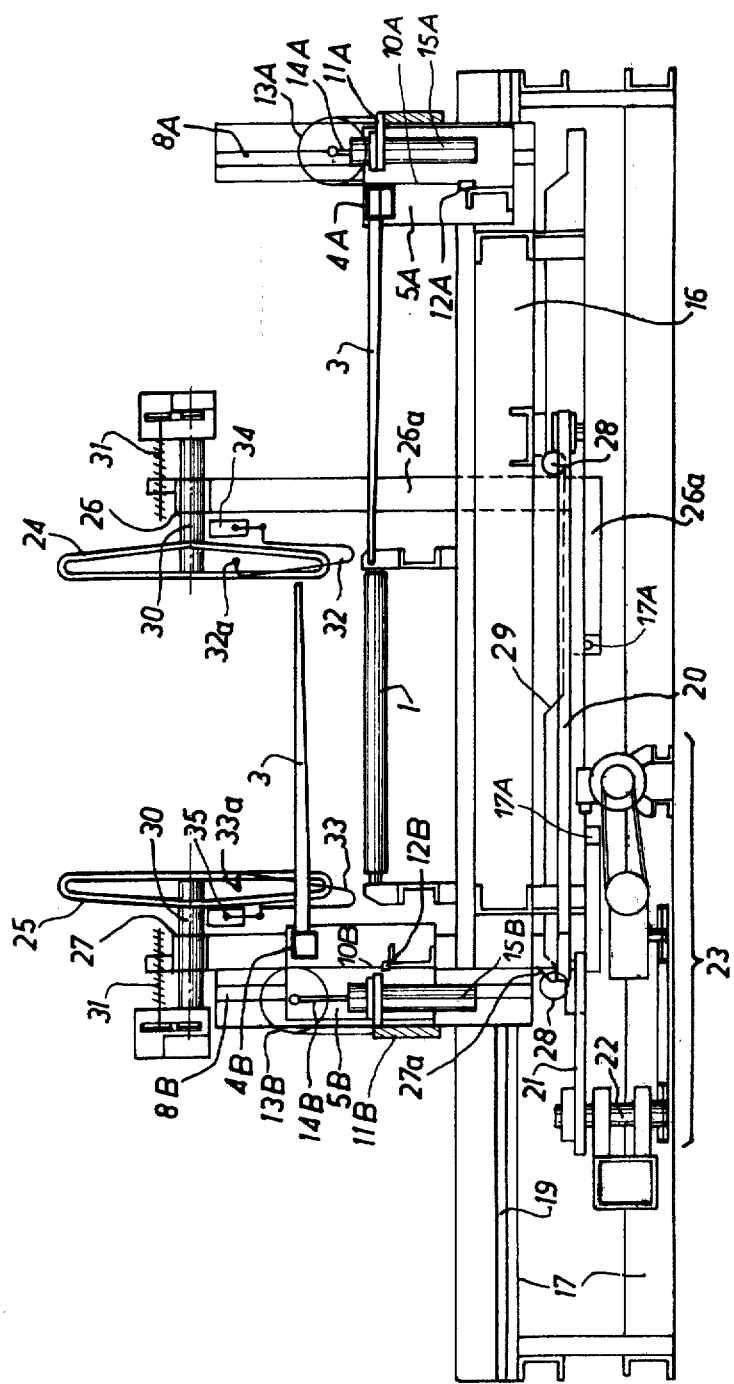

MACHINE FOR LOADING PACKAGES ON A PALLET

The present invention has for its object a machine intended to load packages and cases on a pallet. It is of the kind in which the successive layers of packages are introduced one below the others.

The working cycle of a known machine of this type consists of stacking the previously-formed layers, gripping them with a powerful pinch-bar, lifting them, introducing a fresh layer underneath, depositing the first layer on the second, placed below, then bringing down the pinch-bar so as to clamp the two layers at the same time, and again lifting them, after which the same operation is started again $n$ times.

This machine is very rapid but all the packages cannot be clamped, which limits its use.

The working cycle of another known machine of this type consists in supporting unit load being prepared on forks, disengaging the forks laterally with a view to depositing the unit load on a layer of packages introduced underneath this load, bringing the forks down to a lower level at the stacking area, bringing up the forks at this lower level, lifting the forks under the unit load to which is added the newly-introduced layer of packages, means being provided for holding the unit load laterally without clamping it, during the course of preparation. This cycle includes dead times: withdrawal, downward movement, approach and upward movement of the forks.

The machine according to the invention provides a remedy for these drawbacks, and is characterized in that it comprises, in combination:
— Means for bringing-in packages;
— a stacking area for putting the packages in layers;
— two means with forks for lifting by either of these means the unit load in course of preparation to a height sufficient to permit the insertion under this lifted load, of a layer of packages;
— a means giving a relative alternating movement of translation of the whole of the two fork means with respect to the stacking area of conversely of the stacking area with respect to the whole of the two fork means;
— means for laterally retaining the load during the course of its preparation.

Other characteristic features and advantages of the present invention will be brought out in the description which follows below, reference being made to the accompanying drawings, in which:

FIG. 2 is a view of this machine in cross-section, taken along the line II—II of FIG. 1;

Figure 1:
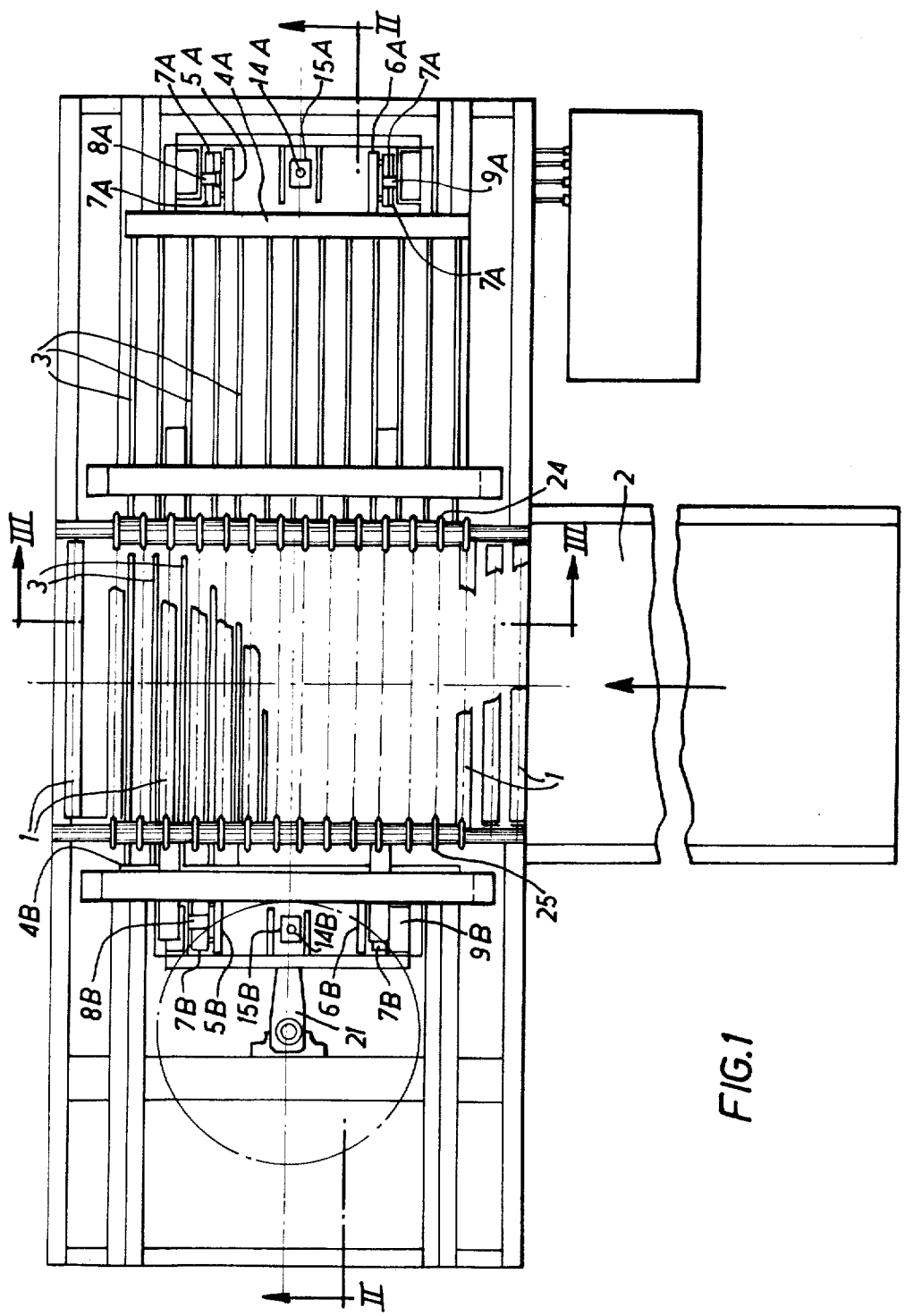
FIG. 1 is a plan view of one form of construction of a machine according to the invention.

In the form of embodiment shown in FIGS. 1 to 6, the machine according to the invention comprises an area for stacking packages in successive layers, starting from the bottom. This area is constituted by a layer of parallel driving rollers 1.

Each layer of packages is made-up previously on a preparation table 2.

Between the rollers 1, the teeth 3 of forks are able to move in vertical and horizontal planes. These are provided two forks 4A and 4B comprising teeth of this kind, and these are located facing each other on each side of the stacking area.

Each fork is rigidly fixed to legs 5A – 6A or 5B –6B, supporting trunnions for rollers 7A or 7B, rolling on vertical rails 8A – 9A or 8B – 9B.

Each fork-leg assembly receives an upward movement or a downward movement between the rails with which it is associated my means of a chain 10A or 10B of constant length, one of the extremities of which is attached to a fixed point 11A or 11B, while the other extremity is coupled to the fork-leg assembly at a point 12A or 12B, a thrust being applied to this chain by means of a pulley 13A or 13B, on which it is carried, the pivot of this pullely being mounted on the upward or downward movement rod 14A or 14B of an actuating mechanism 15A or 15B.

The vertical rails 8A – 9A or 8B – 9B are rigidly fixed to a plate 16 capable of sliding in the frame 17 of the machine. The sliding plate 16 carries trunnions for rollers 18 rolling on the horizontal rails 19 of the frame. It is driven in its movements by means of a crank-arm 20 articulated on the one hand to the plate and on the other hand to a crank-arm 21 keyed on a shaft 22 driven in rotation by a motor speed-reducing gear with driving pulleys 23.

Lateral retention gratings 24 and 25 are provided to retain the unit load without stress during the course of preparation. The teeth 3 of the forks 4A and 4B can pass between the bars of the gratings 24 and 25.

Figure 3:
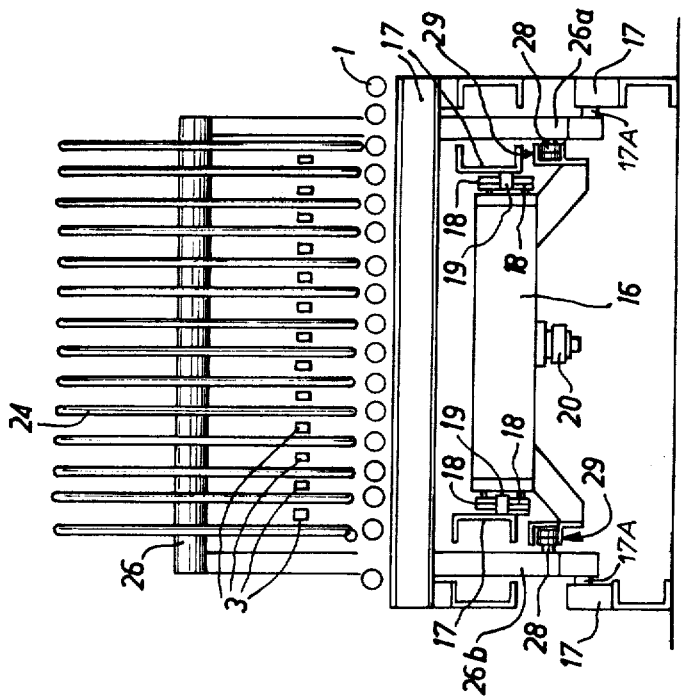
FIG. 3 is a view in cross-section taken along the line III—III of FIG. 1.

At the moment of the evacuation of the unit load finally completed, the gratings 24 and 25 are moved slightly apart. To this end, each of them is carried on a rocking gantry 26 or 27, the legs of which $26_a - 26_b$ or $27_a - 27_b$ are articulated at 17A on the frame 17 of the machine, as shown in FIG. 3. Each gantry leg carriers a roller 28 intended to co-operate with a cam 29. Two cams 29 are provided, each associated with one leg of a gantry and one leg of the other gantry, both located on the same side of the machine. The cams 29 are fixed on the sliding plate 16, and on FIG. 2 of the drawings, the plate and the cams are shown in positions such that a spacing apart of the gratings 24 and 25 has been obtained.

Figure 8:
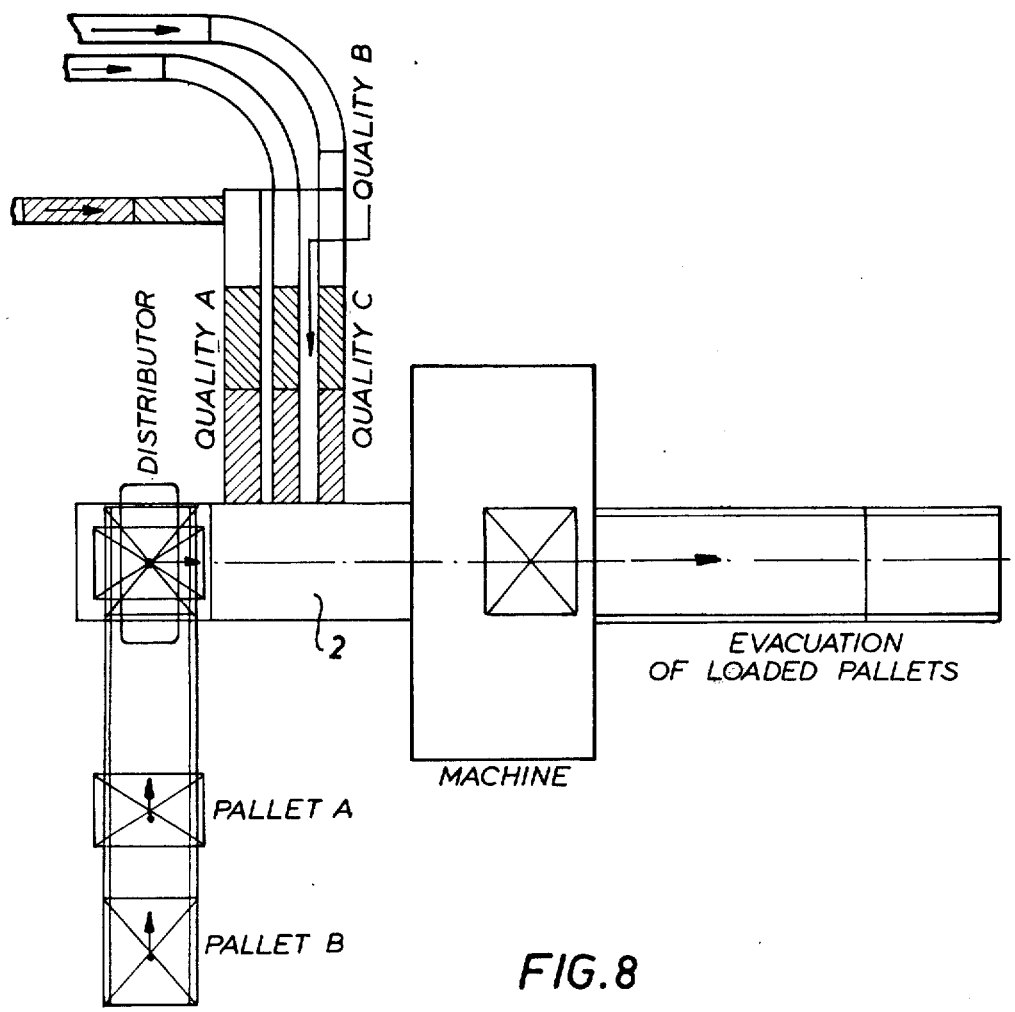
FIG. 8 is a general installation diagram of a machine in accordance with the invention.

The gratings 24 and 25 can each be mounted on to horizontal arms 30 capable of sliding in the transverse boom of the gantry. These arms are actuated by an electro-mechanical jack 31. It is then possible to adjust very rapidly the width of the load by acting on the jacks 31. This same movement may be utilized to compact the load, if so required, so as to bring it to a given size without clamping. This enables different unit loads to be prepared with different widths, each of them being derived or not from a different chain of manufacture (quality A, quality B, quality C, see FIG. 8), but produced on a different pallet (pallet A, pallet B, FIG. 8). This arrangement with electro-mechanical control of the gratings 24 and 25 on their gantries is also advantageous when the prepared load does not need to be deposited on a pallet. It is also to be recommended when it is necessary to compact the load at each layer and to release the gratings 24 and 25 during the upward or downward movements in order to prevent the packages from being marked by rubbing during the upward movement. The compacting is effected before the withdrawal of the forks 4A and 4B and by acting on the electro-mechanical jacks 31 in order to bring the gratings to the desired dimensions.

The fact of stacking from underneath makes it necessary to consider the pallets as layers of packages and it is especially essential that they should be able to pass in all places where the layers pass. Another arrangement constituted by two sets of additional gratings 32 and 33, articulated at 32a and 33a on the main gratings 24 and 25, and actuated by jacks 34 and 35, enables the compacting of a layer of packages and the centering of a pallet to be effected when the layers and the pallet do not have the same width and when the layers have substantially the same height as the pallet.

Figure 4:
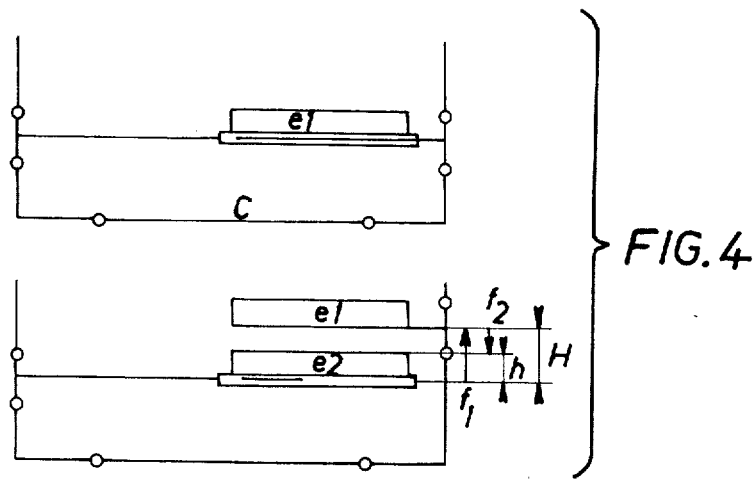
FIGS. 4, 5 and 6 are explanatory diagrams of the operation of the machine.

The cycle of operation of the machine according to the invention is as follows:

From FIG. 4:

A first layer $e1$ of packages is brought on to the layer of rollers. The fork 4A, the teeth 3 of which are located between the rollers, moves upwards (arrow $f1$) through a height H and lifts the layer $e1$. The second layer $e2$ is brought on to the rollers, the height $h$ of the layer being less than the height H. The fork 4A moves downwards (arrow $f2$) until it comes to the height $h$.

Figure 5:
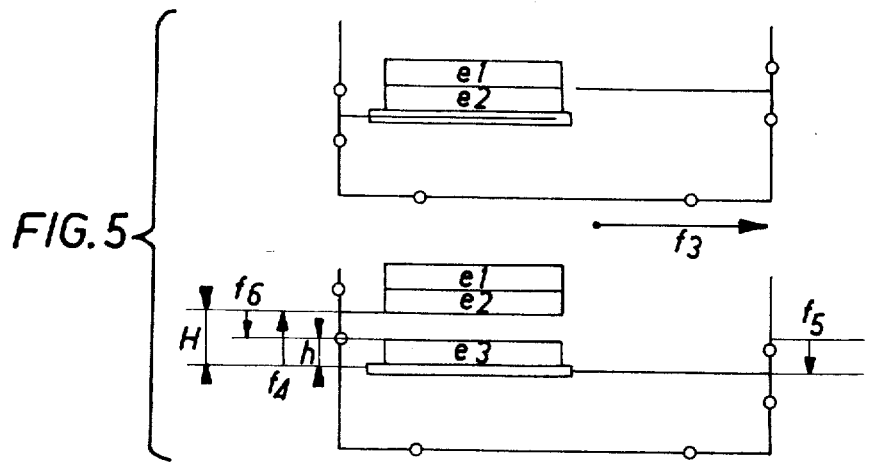

From FIG. 5:

The sliding plate 16 is moved laterally (arrow f3) from the position C to the position $C_1$, which has the effect simultaneously of depositing the layer $e1$ on the layer $e2$ by withdrawal of the fork 4A due to the fact that the layer $e1$ is retained in translation by the grating 24, and of introducing the fork 4B underneath the load ($e1 - e2$).

The fork 4B moves upwards (arrow $f4$) through the height H, and the following layer $e3$ is introduced on the rollers, while the fork 4A moves downwards (arrow $f5$) to the height 0. The fork 4B moves downwards (arrow $f6$) until it is at the height $h$.

Figure 6:
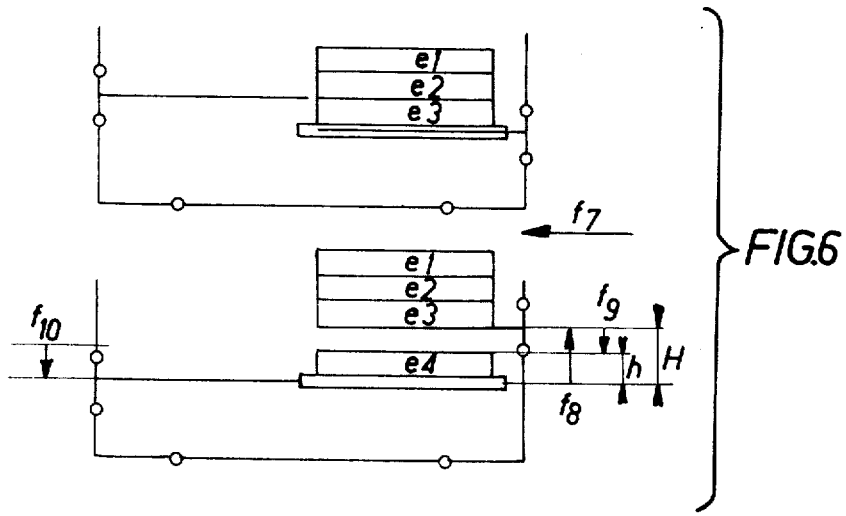

From FIG. 6:

The plate 16 is moved laterally (arrow f7) so as to return to the position C. During this phase, the layers $e1$ and $e2$ are deposited on the layer $e3$ by withdrawal of the fork B, and the fork 4A is introduced underneath the load. The fork 4A carrying the layers $e1-e2-e3$ moves upwards (arrow $f8$) to the height H and then the layer $e4$ is introduced and the fork 4A moves downwards (arrow $f9$) until it is at the height $h$ so as to be in the same position as in the figure, and the remainder of the cycle is repeated until the desired number of layers is stacked.

Figure 7:
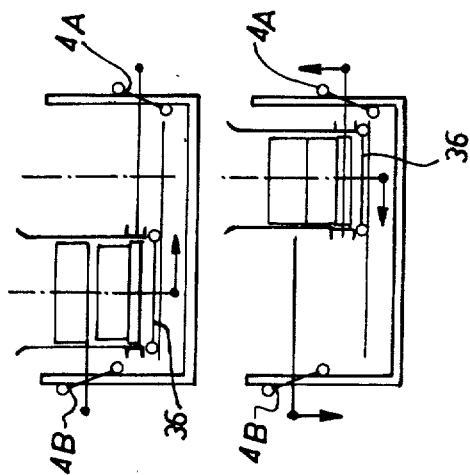
FIG. 7 is a diagrammatic view of an alternative form of construction.

In the alternative form shown diagrammatically in FIG. 7, the forks 4A and 4B have an upward and downward movement but do not have any movement of translation, this latter movement being impressed on the load itself carried by the rollers 1 mounted on a moving frame 36.

It will of course be understood that the present invention has been described and illustrated solely by way of a preferred example, and that equivalents may be added without thereby departing from the scope of the said invention as defined in the appended claims.

It is of course possible to provide a single preparation table with a single intake; there may also be provided any other system and in particular, without any limitation:

— A supply with a double preparation table and two package arrival arrival stations;
— a double supply with one preparation table elongated to provide two preparation positions;
— a supply with a single table and three arrival positions (the case of FIG. 8) in which the arrivals may have square tables in order to programme the packages as required, either lengthwise or transversely, and in which bare pallets are distributed by an aerial distributor, as shown in French Pat. No. 1,502861 dated Oct. 16, 1967. In that manner unit loads of different qualities (quality A - quality B) and different dimensions can be formed on pallets of different qualities and dimensions.
— certain unit loads of packages (packages of quality C) can be formed and evacuated without the use of pallets.

I claim:

1. A machine for loading packages on a pallet, of the kind in which the successive layers of packages are introduced from the bottom, characterized in that it comprises, in combination, and area for stacking the packages in layers and having parallel rollers, means for bringing the packages onto the said area, two lifting means facing each other on each side of said stacking area for continuously lifting successive layers wherein one layer is lifted by one of said lifting means through a height sufficient to permit another layer of packages to be slid under the first layer, the other layer is lifted by the other lifting means when said first lifting means is withdrawn depositing said first layer on said other layer, said first lifting means then returning to lift a successive layer and lateral retention means for stripping the layer off each of the lifting means as the lifting means is withdrawn.

2. A machine in accordance with claim 1 characterized in that a horizontally-sliding plate carries the said two lifting means.

3. A machine in accordance with claim 2, and further characterized in that vertical members rigidly fixed to the said plate serve for the vertical displacements of the said lifting means which are constituted by forks.

4. A machine in accordance with claim 1 characterized in that a horizontally-sliding frame carries the said stacking area.

5. A machine in accordance with claim 4, and further characterized in that fixed vertical members serve for the vertical displacement of the said lifting means, which are constituted by forks.

6. A machine in accordance with claim 1, characterized in that separating means permit the said lateral retention means to be moved father apart at the moment of evacuation of the load of packages, cam devices operatively connected with said separating means for controlling said separating means, supports and horizontal arms sliding horizontally in the said supports and carrying said lateral retention means, said arms being actuated in such manner as to adjust very rapidly the width of the load by means of said lateral retention means and to compact the load at each layer.

7. A machine in accordance with claim 1, characterized in that two supplementary means articulated on the said lateral retention means enable compacting of a layer of packages and the centering of a pallet to be effected.

8. A machine in accordance with claim 1, characterized in that it is associated with an aerial distributor of bare pallets permitting the formation of unit loads of packages of different qualities and dimensions on pallets of different qualities and dimensions.

* * * * *